No. 637,017. Patented Nov. 14, 1899.
J. S. ORAM.
MACHINE ELEMENTS.
(Application filed May 20, 1899.)
(No Model.) 2 Sheets—Sheet 1.
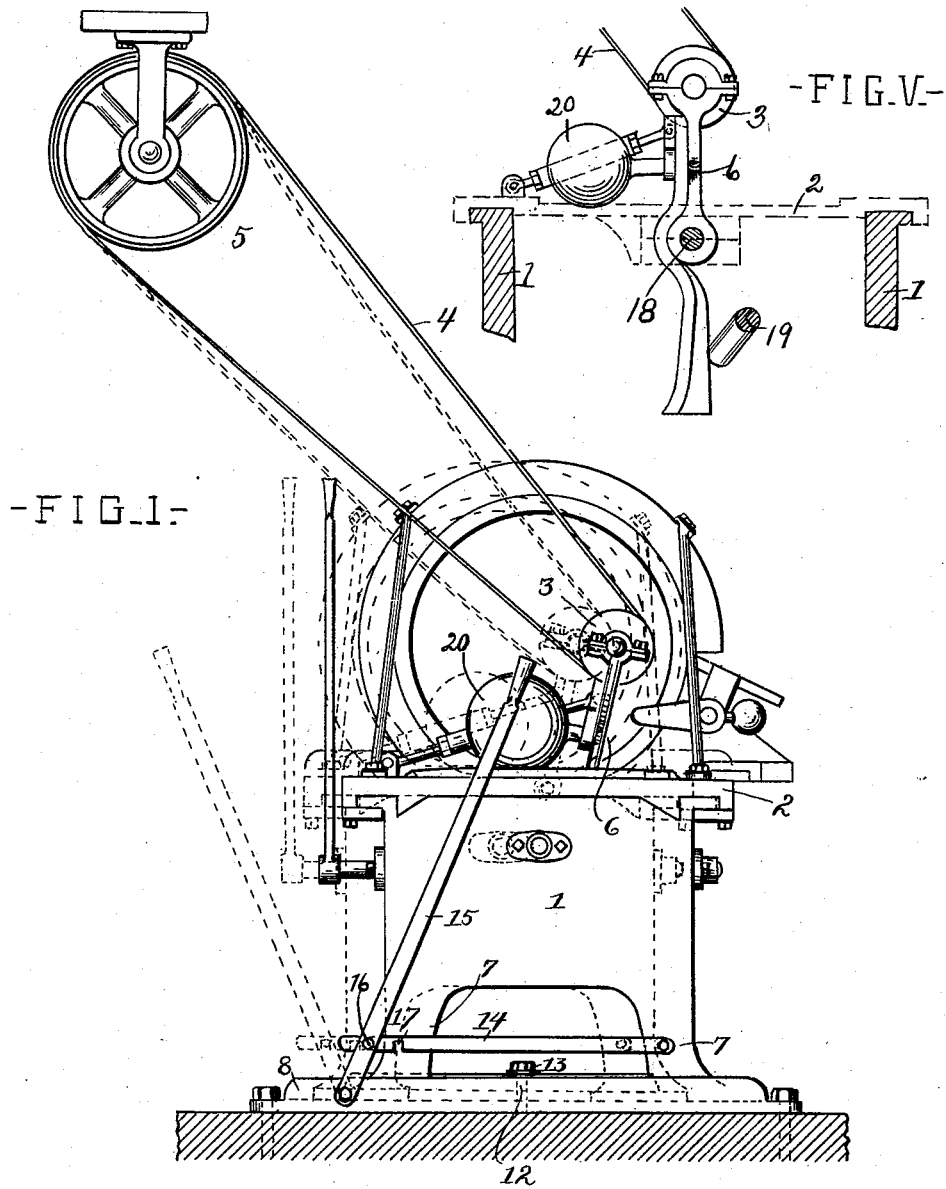
Witnesses,
J. C. Turner
E. A. Henderson
Inventor,
John S. Oram
By
A. W. Austin
Atty.

No. 637,017. Patented Nov. 14, 1899.
J. S. ORAM.
MACHINE ELEMENTS.
(Application filed May 20, 1899.)
(No Model.) 2 Sheets—Sheet 2.
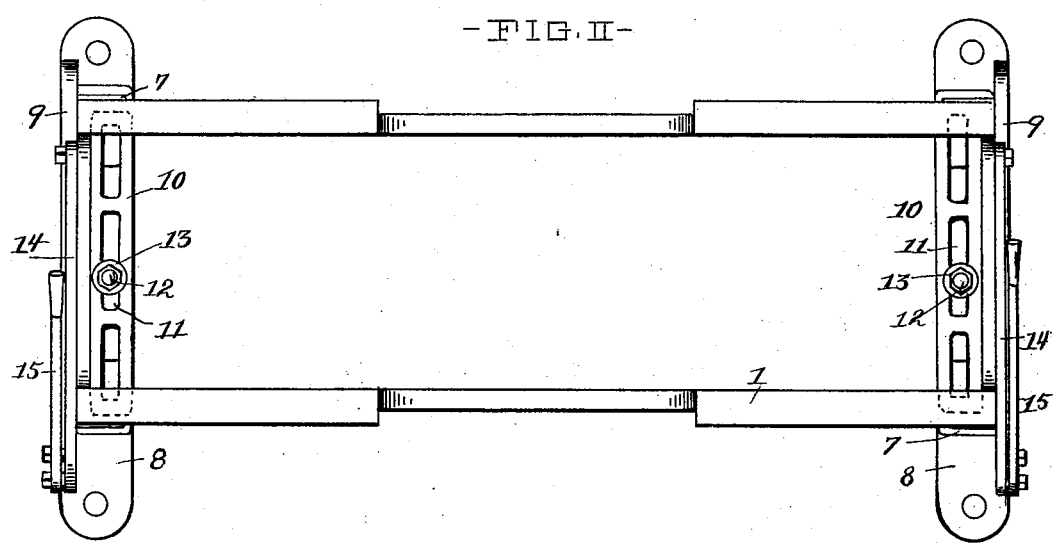
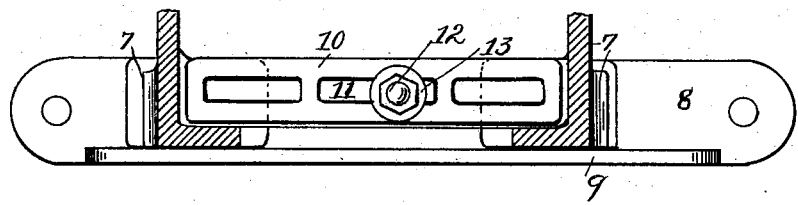
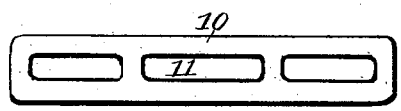
Witnesses,
J. C. Turner
C. B. Henderson.
Inventor,
John S. Oram
By
Ashbaustin
Atty

UNITED STATES PATENT OFFICE.

JOHN S. ORAM, OF CLEVELAND, OHIO.

MACHINE ELEMENTS.

SPECIFICATION forming part of Letters Patent No. 637,017, dated November 14, 1899.

Application filed May 20, 1899. Serial No. 717,580. (No model.)

*To all whom it may concern:*

Be it known that I, JOHN S. ORAM, a citizen of the United States of America, residing at Cleveland, county of Cuyahoga, State of Ohio, have invented certain new and useful Improvements in Machines, of which the following is a specification.

My invention relates to improvements in machines, especially to chamfering, crozing, and howeling machines; and it consists in providing means for properly adjusting said machines and in the new and novel features of construction and combination of parts hereinafter set forth.

In the annexed drawings, Figure I represents an end view of a machine provided with my improvement; Fig. II, a plan view of the same with the platens and cutting mechanism removed; Fig. III, an enlarged detail view, partly in section, of the adjusting device; Fig. IV, a detail view showing the slotted connecting-rod; Fig. V, a cross-sectional view showing the attachment of the movable arm to the platen.

The frame 1 of the machine is provided with platens 2, upon which the cutting mechanism of the machine is mounted. A pulley 3 is operatively connected with said cutting mechanism and receives power from and is rotated by a belt 4, that passes over the shafting 5. Said pulley is journaled upon the movable arbor 6, that is pivoted by means of a pintle 18 to the platen so as to permit a limited swinging movement of the same. A weight 20 is secured to the arm and holds same against the crank-shaft 19, that is operated by any suitable means, whereby said arm and pulley may be adjusted. The frame is preferably formed with standards 7, movable upon a base-plate 8, provided with an upwardly-extending flange 9. A connecting-rod 10, provided with slots 11, is secured between the standards and has a bearing upon the base-plate. Said connecting-rod is secured to the base-plate by means of a bolt 12, passing through said base-plate and the slot in the connecting-rod, and is held against upward displacement by a nut 13. An arm 14 is pivoted to the frame and projects beyond one side thereof. A vertical lever-arm 15 is pivoted to the base-plate below the free end of the arm and is provided with a stud or projection 16, adapted to engage with notches 17, provided in the free end of the arm.

Similar cutting mechanism is provided at each end of the machine in order that both ends of the barrel may be operated upon simultaneously. The arbor which carries the pulley is permitted a limited swinging movement to adjust the cutting mechanism to various sizes of barrels. When the cutting mechanism has been properly adjusted, the frame of the machine is thereupon moved backward or forward by means of the vertical lever until the belt is drawn sufficiently taut to properly operate same. By inserting the projection on the vertical lever into the various notches provided on the arm sufficient purchase can be obtained to move the frame easily notwithstanding its weight. After the cutting operation has been completed the arbor is swung on its pivot, thereby disengaging the cutting mechanism and permitting the belt to run loosely over the pulley.

Heretofore in machines of this kind the rotation of the arbor has been the only means of adjusting the cutting mechanism and regulating the driving-belt or power-communicating means. It is impossible, however, to adjust the cutting mechanism to different sizes of barrels and always have the driving-belt of sufficient tightness to operate properly. It is frequently desirable also, on account of the construction of the building or for other reasons, to so place the machine in relation to the shafting that only certain sizes of barrels can be operated upon without moving the machine or relacing the driving-belt. My invention permits the machine to be shifted from one position to another without changing its foundation, and the expense and delay of cutting and relacing the belt is avoided. The adjustment of the cutting mechanism is therefore easily and quickly accomplished and the value and efficiency of the machine greatly increased.

What I claim is—

1. The combination with a machine-frame provided with a suitably-actuated machine-tool pivoted to the frame and having a limited swinging movement thereon, of a stationary base-plate providing a bearing for said frame, and means for moving the frame on said base-plate, substantially as described.

2. The combination with a machine-frame provided with a machine-tool pivoted to swing upon the frame and actuated by a suitably-driven belt, said frame being movably secured to a stationary base-plate, of means secured to said base-plate and engaging with said frame to move same, substantially as described.

3. The combination with a machine-frame, movably secured to a fixed base-plate and provided with a machine-tool pivoted to swing on said frame and actuated by a suitably-driven belt, and an arm pivoted to said frame and projecting beyond one side thereof, having notches in its free end, of a lever pivoted to a flange formed on said base-plate and provided with a projection adapted to engage with said notches, substantially as described.

4. The combination of a machine-frame, supported by standards and having a slotted connecting-rod between said standards, a base-plate provided with an upwardly-projecting flange and means for movably securing said connecting-rod to said base-plate, an arm pivoted to the frame and projecting beyond one side thereof and provided with notches in its free end, and a lever pivoted to the flange beneath the free end of the arm and adapted to engage with said arm, substantially as described.

In testimony whereof I sign this application, in the presence of two witnesses, this 17th day of May, 1899.

JOHN S. ORAM.

Witnesses:
G. H. FOSTER,
C. I. HENDERSON.